United States Patent Office 3,389,078
Patented June 18, 1968

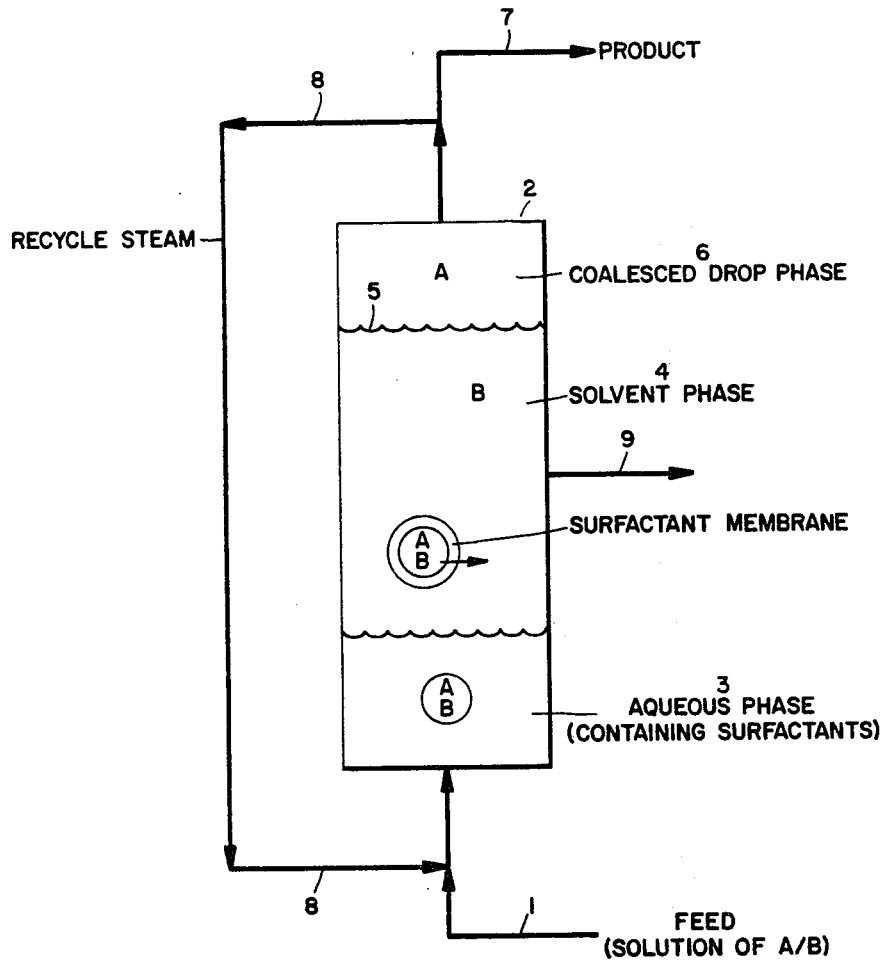

3,389,078
LIQUID SEPARATION THROUGH A PERMEABLE MEMBRANE IN DROPLET FORM
Eugene R. Elzinga, Westfield, and Norman N. Li, Somerset, N.J., assignors to Esso Research and Engineering Company, a corporation of Delaware
Filed Jan. 20, 1966, Ser. No. 537,580
6 Claims. (Cl. 208—308)

ABSTRACT OF THE DISCLOSURE

A process for separating mixtures by selective permeation through a liquid membrane. The mixture to be separated is passed into a liquid surfactant solution where individual droplets of the mixture are coated with the liquid surfactant, thereby forming a liquid membrane. The droplets are then contacted with a solvent. The more permeable component or components of the mixture pass through the membrane into the solvent. The less permeable component or components remain within the droplet. The more permeable component(s) is then separated from the solvent, and the less permeable component(s) is separated from the aqueous phase.

---

This case pertains to a method for separating materials. More particularly, this case pertains to a method of separating hydrocarbons. In a preferred form of this invention the hydrocarbons to be separated by this invention are similar in their physical and/or chemical properties so that traditional means of separation have been at least somewhat ineffective in separating them. The separation of these similar hydrocarbons is achieved by means of selective permeation through liquid membranes which are formed by molecules of surfactant droplets.

The problem of separating materials which have similar physical and chemical properties has been well known in the art for a considerable length of time. Often these materials are hydrocarbons which have similar boiling points but substantially different characteristics such as iso and normal paraffins having the same number of carbon atoms. This would also be the case for aromatic hydrocarbons and normal paraffins which have the same number of carbon atoms such as benzene and hexane. In addition, certain mixtures of compounds which may contain at least one organic compound or hydrocarbon when distilled produce vapors that have the same composition as the liquid mixture. These particular mixtures are called azeotropic mixtures. Since there is a constant boiling point, the individual components of the mixture cannot be separated by ordinary distillation. Azeotropic distillation wherein a third component is added to produce other azeotropic mixtures which are separable has been employed. However, the third component must be carefully selected so that the new azeotropes formed can be resolved by stratification, solvent extraction followed by distillation or distillation which is usually required to be under vacuum. The disadvantages of such a situation are obvious; it is expensive and often separations have not been as complete as would be desired.

For a long period of time it has been known to make use of solid membranes to effect difficult separations. These membranes were somewhat effective but still presented many substantial drawbacks. A more advanced modification concerning the use of membranes relates to the use of polymeric plastic films for the separation of mixtures. These films are thinner than the traditionally utilized membranes and operate on a different principle. One of the components of a mixture must be soluble enough in the polymer to allow for permeation without softening the film because of the real danger of the film rupturing.

According to this invention, the problems of prior art membranes have now been solved. It has unexpectedly been discovered that separation of materials, especially hydrocarbons, which may be quite similar in their physical and/or chemical properties can be achieved by selective permeation through "liquid membranes" formed by aqueous solutions of surfactant molecules. Surfactants are surface active agents having hydrophobic and hydrophilic ends. The advantage of these liquid membrane films over the solid polymeric films used in the past are numerous. Film life is extremely critical in selecting polymeric membranes whereas the problem does not exist in liquid membranes. Unlike its solid state counterpart, the liquid membrane is homogeneous in composition and is free of pin holes as a result of surface tension effect. Additionally, the solid membrane requires mechanical support; a liquid surfactant membrane would not need a support.

The thinnest solid polymeric membrane which may be reasonably utilized is about $10^{-4}$ inches thick. Whereas for liquid membrane, which can be a single molecular layer, the thickness may be in the order of $10^{-7}$ inches. Since permeation rate is inversely proportional to the film thickness, the use of a thinner membrane results in a far higher permeation rate.

Mass transfer rates per volume of equipment are also considerably higher because droplets have more interfacial area. The key to a successful permeation operation is the rate at which the liquid diffuses through the membrane utilized. If the rate is slow, the process becomes too time consuming and is, therefore, ineffective. The instant process because of the advantages enumerated above provides for an especially fast rate of permeation along with high selectivity.

In more detail, the process of the instant invention concerns the discovery that hydrocarbons which are similar in their physical and/or chemical properties can be separated by selective permeation through liquid membranes which are formed by surfactant molecules. This invention also will be applicable to the separation of a mixture in which at least one component is a nonhydrocarbon, or an azeotropic mixture in which at least one component is a nonhydrocarbon. Any of the various water soluble surfactants may be utilized but for a desired separation, a tailor made surfactant may be necessary to achieve maximum results. The purpose is to have the hydrophobic part of the surfactant molecule as similar to the permeate molecule in structure as possible. In separating hydrocarbons based on a difference of molecular polarity, ionic surfactants are preferred. Normal paraffins may be separated from olefins in this manner since the double band makes the olefin more polar. An ionic surfactant which dissociates in liquid such as saponin should be utilized. The olefin is attracted and tends to diffuse through more readily than the paraffin. Any water soluble surfactant may be utilized whether it is ionic or nonionic. As indicated above, there are times when either ionic or nonionic surfactant membranes would be preferred. All surfactant membranes utilized will be used in aqueous solution so they must be water soluble.

A wide variety of different surfactant groups may be utilized for the process of this invention. The various surfactant groups include anionic surfactants, cationic surfactants, nonionic surfactants, amphoteric surfactants and miscellaneous surfactants such as polymeric surfactants and fluorocarbon surfactants may be utilized with the process of this invention. The preferred groupings of surfactants are the cationic surfactants and anionic surfactants since they are ionizable and the presence of a charge aids the instant invention. The other surfactant groups may be utilized with varying degrees of success.

The various surfactants may be categorized in the following manner. The anionic and cationic surfactants both ionize in solution. Anionic surfactants ionize in solutions and produce a negative charge. By contrast cationic surfactants ionize in solution and produce a positive charge. The general classification of nonionic surfactants refers to those surfactants which do not ionize in solution at all. The various amphoteric or ampholytic surfactants ionize in solution and produce either a positive or negative charge depending upon the pH of the solution.

Anionic surfactants include a wide range of compounds. Perhaps the best known of which are the soaps which are water soluble salts of long-chain carboxylic acids. The soaps usually contain 12 to 18 carbon atoms per molecule and may be prepared from saturated or unsaturated fatty acids. Generally, the soaps are salts of sodium and potassium or ammonia. Included among them are the aliphatic sulfonates which are represented by the general formula: $R \cdot SO_2 \cdot O-$, $Na+$ in which R may be a straight-chain or branched-chain paraffin chain, or a cyclo-aliphatic radical. An example of this group would be sodium tetradecane sulfonate. Additionally, the group includes sulfonates of aliphatic-aromatic hydrocarbons such as alkylated naphthene, alkylated benzene, and aralkyl aromatics. The alkyl benzene sulfonate type of detergent has received wide use in industry. When utilizing benzene as the aromatic constituent of the surface active agent, it has been found that best results can be achieved if one of the alkyl groups is $C_{10}$ to $C_{14}$ in length. Other surface-active agents included in this general group are ester sulfonates such as sulfoester and sulfoacyl compounds, amide sulfonates such sulfoamide and sulfoacyl amide compounds and sulfoamide sulfonates. Additionally, sulfonates containing ether, amino, keto and sulfone groups may be utilized.

The anionic surface-active agents also include the class of aliphatic sulfates which is characterized by the generic formula of $R(OSO_3-, Na+)_n$ wherein R contains one or more hydrophobic groups and $n$ is at least one. Traditionally, R is a saturated or unsaturated aliphatic group, branched or with a straight chain usually containing 12 carbon atoms. Shorter chains may be utilized. The group contains sulfated fatty alcohols such as straight-chain, secondary, tertiary and branched-chain fatty alcohol sulfates. Additionally, sulfated fatty condensation products, sulfated fatty glycerides, acids and esters as well as sulfonated oils may be used.

The general group of cationic surfactants includes amine salts as well as quaternary ammonium compounds. Salts of long-chain primary alkyl amines including octadecylamine and dodecylamine are effective surfactants in this group. However, the secondary, tertiary amine salts and quaternary ammonium salts are preferable. Amine salts having at least one alkyl group of $C_8$ to $C_{20}$ are effective surfactants.

The nonionic surfactants also represent a wide grouping. Included within this group are the sugar esters as exemplified by the fatty esters of glycol, sorbitol and mannitol. The fatty alcohol amides also fall within this category. Additionally, derivatives of ethylene oxide such as the Igepals are also nonionic surfactants. The Igepals are discussed in more detail below.

The final overall grouping can best be called miscellaneous and includes a broad category of marcromolecules and polymers. Included within this group are the polyvinyl alcohols and derivatives thereof such as aldehydes derived from various polyvinyl alcohols. Polyvinyl esters are also effective as surface-active agents.

Since the number of surfactants is extremely large, it is not intended to burden this application with numerous examples. The following publications are herein incorporated by reference. Surface Chemistry by Lloyd I. Osipow, Rheinhold Publishing Company, New York (1962), ch. 8 and Surface Activity, Moilliet et al., Van Nostrand Company, Inc. (1961), pt. III.

Typical surfactants that may be utilized with this invention include Igepal. This is a nonionic surfactant, nonyl-phenoxypolyethyleneoxy ethanol. It is a trademark of the General Aniline and Film Corporation and has the configuration $RC_6H_4O(CH_2CH_2O)_n CH_2CH_2OH$ where R may be $C_8H_{17}$, $C_9H_{19}$ or $C_{10}H_{21}$ and $n$ varies from 1.5 to 100. Other surfactants include polyvinyl alcohol, a surface-active macromolecule; trimethyldodecyl ammonium chloride, an effective cationic quaternary ammonium surfactant; sodium dodecyl sulfate, an effective surfactant of anionic aliphatic sulfate saponin, another surface-active agent in the group of anionic surfactants, is better known as sapogeninglycoside. It is a type of glycoside which is widely distributed in plants. All saponins foam strongly when shaken with water. They form oil in water emulsions and act as protective colloids. Each saponin molecule consists of a sapogenin which constitutes the aglucon moiety of a molecule and a sugar. The sapogenin may be a stearoid or a triturpene and a sugar moiety may be glucose, galactose, pentose or a methyl pentose. Saponin has been hypothesized according to Hackh's Chemical Dictionary by Julius Grant, third ed., 1944 (McGraw-Hill Book Company, Inc.) as having a formula $C_{32}H_{54}O_{18}$ and a molecular weight of 726.5.

A layer of suitable surfactant is formed and the mixture to be separated is passed through the surfactant layer. Individual layers of surfactant encompass the droplets of various mixtures. The surfactant coated droplets are then passed through a solvent phase. The component of the mixture which more readily passes through the surfactant must be substantially miscible with the liquid solvent phase so that it may readily enter into the solvent. In fact all aspects of the mixture must be miscible to some degree with the solvent phase. Selective permeation takes place when the droplets are in the solvent phase. Every component of the mixture to be separated should be miscible with the solvent phase. The miscibility is preferred to be substantially similar for all components of the mixture since this is not an extraction process.

The solvent phase is preferably organic in nature. The surfactant coated droplets, which are now enriched with the compound which permeates less readily, gradually arise out of the solvent phase and coalesce to form a separate phase. This collapsed droplet phase is rich in the material which less readily passes through the liquid surfactant membrane. In this manner, the coalesced drop phase condenses rich in at least one particular component of the mixture. The component or components which less readily diffuses through the liquid surfactant membrane remains within the coalesced drop phase. Needless to say, in many cases part of the more permeable component will also stay within the condensed drop phase. However, as compared to the original mixture the condensed drop phase will be richer in the less permeable component. It may now be recovered as product in the case of a mixture where at least one component readily diffuses through the surfactant membrane and the other substantially remains within the membrane in its entirety. However, in an instance where there is a small difference in the relative rate of permeation through the liquid surfactant membrane the coalesced phase may be recycled to increase the separation efficiency. When the surfactant droplets coalesce, the membrane ruptures and the less permeable component passes out. In this manner the less permeable component may be recovered.

As another alternative, multi-stages may be used to achieve additional enrichment in the non-permeating compound or compounds. It would be apparent that using several stages of permeation a very fine separation can be made of almost any mixture no matter how close the relative rates of permeation are of the components of the mixture. Either stage, the permeating or non-permeating, may be subjected to further treatment.

The various mixtures which are to be separated by the instant invention are extremely numerous. Hydrocarbons of similar weight but different configuration can readily be separated. This category would include the separation of normal paraffins and isoparaffins such as normal pentane and isopentane.

In that case, the surfactant such as Igepal would preferably be nonionic since the two components to be separated are not polar. The liquid surfactant membranes of this invention may also be used to separate paraffins from olefins. Since the olefins are polar, an ionic membrane may be utilized for best results. The polar olefins will pass through the liquid surfactant membrane far more readily than the non-polar paraffins of similar weight or configuration.

It should be emphasized that nonionic and ionic surfactant membranes may be used interchangeably for all separations. The use of ionic surfactants is preferred when there are polar molecules in the mixture to be separated. This preference is based on the fact that the polar molecules are attracted to the ionic membrane and this increases the permeation rate.

This invention would also include the use of nonionic surfactant membranes for the separation of isoparaffins from naphthenes or normal paraffins from naphthenes as would be the case in the separation of normal hexane from cyclohexane. Additionally, aromatics can be separated from paraffins as in the separation of normal hexane from benzene or toluene from normal or isoheptane. These separations would operate more efficiently with ionic surfactant membranes since there are polar compounds to be separated from the non-polar paraffins. The separation of azeotropic mixtures such as hexane and cyclohexane, benzene and cyclohexane, isopentane and methylbutene can also be effected.

Additional separations that can be effected include the following. Separation of benzene from steam-cracked naphtha, separation of petroleum fractions for recovering aromatics, hydrocarbon isomers or for improving octane number of gasoline boiling-range fractions and separation of azeotropes and close-boiling mixtures of water and oxygenated hydrocarbons such as alcohols, ketones, ethers, aldehydes and acid. Perhaps the most effective separation is that of diolefins from aromatics; diolefins permeate far more rapidly. It is especially preferred to utilize ionic surfactants for this separation.

With respect to the permeability of various mixtures, the following general rules may be stated; it should be noted that there are exceptions to these rules and they are intended only as a guide. The permeation of the more volatile component will usually be favored. With mixtures of molecules differing only in the extent of unsaturation, permeation of the more unsaturated will be favored. For a given molecular weight, permeation of the molecule smaller in size will be favored. On occasion a lighter molecule may be more bulky and therefore permeate less rapidly.

The following theory is offered for the operation of the instant invention; there is no intent to be bound by any particular mechanism. The process of permeation of fluids through a liquid membrane may be composed of three independent steps. Initially, a solution of the permeating molecules may be formed on the inside face of the liquid membrane. Next, the molecules diffuse through the membrane. Finally, the molecules must be desorbed from the outside face of the membrane. Thus, among the factors which will effect the diffusion through a liquid membrane is the membrane permeate compatibility, activity gradient and membrane hole size.

A wide range of temperatures may be utilized in the process of the instant invention. Temperatures used in the separation process itself are not critical. There would, however, be a lower and an upper limit which would be satisfactory for separation with a liquid phase surfactant membrane. The lowest temperature should be higher than the freezing temperature of the aqueous surfactant solution. It will also have to be higher than the freezing temperature of the surfactant or of the hydrocarbon mixture so that mass transfer will be facilitated.

In the event that nonionic surfactants are utilized, the highest temperature should be lower than the precipitation temperature of the surfactant. If an ionic surfactant is to be used, the highest temperature is restricted by the boiling point of the aqueous surfactant solution. Of course, the temperature will have to be lower than the boiling point of the hydrocarbon mixture or the solvent. Thus, the temperature is to be regulated by the boiling point of the lowest boiling element in the separation. It would be preferred to use room temperature since there is no additional expense in obtaining this level.

Pressure is also not critical and the most desirable pressure would be ambient, i.e. one atmosphere. Sufficient pressure will be needed to maintain all the elements of the separation, i.e. surfactant, solvent and hydrocarbon mixtures, in liquid phase.

The amount of surfactant to be added to the mixture which is to be separated may also vary within wide ranges. $10^{-4}$ to $10^{-1}$ moles of surfactant may be added per liter of water, preferably $10^{-2}$ to $10^{-1}$ moles of surfactant per liter of water. It should be emphasized that liquid membranes are utilized for the separation of liquid phase mixtures. The solvent phase must be miscible with the mixture to be separated. This process may also be utilized to separate mixtures of gases.

The attached figure represents a schematic view of the separation scheme of the instant invention.

Turning to the figure, a mixture containing two components of similar boiling point, normal heptane and toluene, is desired to be separated into component parts. The liquid mixture is introduced through line 1 into separation zone 2 at a sufficiently slow speed so as to be dispersed in the aqueous phase. In the bottom region of the zone is an aqueous surfactant phase 3. The surfactant in this case was dodecyl sodium sulfate, however, any of the previously mentioned surfactants would be equally applicable. Within the surfactant phase a liquid membrane composed of surfactant and water forms around each droplet of normal hexane and benzene. The coated droplets pass up through the surfactant zone 3 and into the separation or solvent phase 4. The solvent phase contains an organic solvent, which in this case is kerosene. Other solvents can also be used as long as they are miscible with the hydrocarbon feed and are heavier than the hydrocarbon feed so that droplets can arise through the solvent phase as would be required in the preferred embodiment. A readily obvious variation would be the passage of the mixture upwardly through a lower density solvent.

The aromatic or toluene phase passes into the kerosene far more readily than the normal paraffin phase. The droplets containing surfactant rise within the solvent until area 5 is reached wherein a coalesced drop phase is formed. The surfactant droplets are coalesced at this point with one another. The coalescence of the droplets of surfactant causes a rupture of the liquid membrane and the normal paraffin contained therein escapes and is concentrated in zone 6. Normal paraffin from zone 6 may be removed overhead through line 7 and recovered as product. If greater purity is desired than the 60 to 70% of pure normal paraffin which will be obtained in this manner the product may be sent to subsequent separation zones. Alternatively, the product may be taken through line 8 which comes off line 7 and be recycled along line 8 back through line 1 for further treatment within the same tower. In this manner, normal paraffins of 90 or higher purity can be obtained. The mixture is fed into the separation zone at a rate of 100 to 1000 cc./min. Water droplets containing surfactants produced in the coalesced phase 5 drop back to zone 3 and in this manner substantially no addition of surfactant is needed to maintain sufficient surfactant in the remaining surfactant and water forms an interfacial film between phases 4 and 6 in phase 5, keeping the normal paraffin from dissolving in the solvent phase. The surfactant is kept in a liquid solution; water may comprise 0.001 to 0.5% by weight of surfactants. Permeation rates, using the process of the instant invention, will vary between 1 and 100 gal./hr./ 1000 square foot membrane surface.

If one desires to recover the more permeable element of the mixture this may be removed along with solvent through line 9. Solvent and permeate may be separated by conventional means such as distillation.

Example 1

In this example, a process sequence similar to that of FIGURE 1 was utilized. An aqueous mixture of normal $C_7$ paraffin and toluene was introduced into separation zone 2 through line 1. The volume ratio was 1 to 1 normal paraffin to aromatic. About 0.2 gallon of the aqueous solution was passed into the separating zone. The aqueous phase 3 within the separation zone 2 contains sodium dodecyl sulfate as a surfactant. This was present in the amount of 0.5% by weight of the aqueous phase. The mixture was bubbled through the aqueous phase for a period of about 5 seconds. During this time, the droplets were coated with the surfactant which was sodium dodecyl sulfate. The droplets of normal $C_6$ and aromatics covered by liquid membranes next passed into solvent phase 4. The solvent phase 4 comprised kerosene in the amount of 2 liters. The droplets passed through the kerosene phase for a period of about 1 minute. They then proceeded to coalesce within coalesced drop phase 6. Product was withdrawn overhead through line 7. The product was analyzed and the ratio by volume of normal paraffin to toluene was 1.5 to 1. This represents a significant improvement over the original ratio of 1 to 1. Recycling of the stream through line 8 produced a further improvement; the volume ratio of normal paraffin to toluene was now 2.3 to 1. This indicates the more rapid permeation of the toluene or aromatic phase into the solvent or kerosene phase through the surfactant membrane.

Temperature and pressure in this example were ambient.

Example 2

In this example the process of the instant invention was utilized to separate olefins from paraffins. The aqueous mixture of 0.2 gallon contained octane and octene in a volume ratio of 50 to 50 or 1 to 1. This mixture was injected through line 1 into aqueous phase 3. The aqueous phase contained a surfactant which was saponin in the amount of 0.5 weight percent. The feed solution was passed through the aqueous phase for a period of about 5 seconds and then entered the solvent phase. In this case the solvent phase was two liters of solvent 100 neutral. The octene passed into the solvent phase more readily since it was more polar than the octane. The coalesced drop phase was rich in the other component, i.e. octane. The droplets of surfactant coalesced in coalesced drop phase 5 and zone 6 was rich in octane. This was withdrawn as product through line 7. The product was found by simple analysis to contain a ratio of 55 to 45% by volume of the two components octane to octene. This compared favorably with the original ratio of 50 to 50 by volume. Water surfactant droplets from coalesced drop phase zone 5 fell back through the solvent phase to the aqueous phase 3 so that substantially no make-up of surfactant was needed. Temperature and pressure were ambient for the entire example.

Example 3

In this example, the liquid membrane separation process was utilized to separate normal paraffins from isoparaffins. A mixture of octane and isooctane (trimethyl pentane) with a volume ratio of 1 to 1 was introduced into the aqueous phase 3. The surfactant contained in this phase was Igepal CO–710 at a concentration of 0.5 weight percent. The hydrocarbon droplets coated with Igepal-water films passed into solvent phase 4 from aqueous phase 3. The solvent phase contained two liters of solvent 100 neutral. Isooctane inside the droplets selectively diffused through the Igepal-water membrane into the solvent phase. The droplets then coalesced and formed the coalesced drop phase 6. Product was withdrawn overhead through line 7. The product was analyzed and found to contain octane and isooctane at a ratio of 53 to 47. Recycling the stream through line 8 produced an improvement; the volume ratio was changed to 55.7 to 44.3.

Example 4

In this example, the novel separation process was utilized to separate aromatics from a multi-compound mixture and virgin naphtha. Virgin naphtha contains aromatics, naphthenes and paraffins with carbon numbers ranging from 4 to 10. The initial concentrations of aromatics, naphthenes and paraffins were 22.35, 16.39 and 61.26 weight percent, respectively. Virgin naphtha in the amount of 0.2 gallon was injected into aqueous phase 3 through line 1. The aqueous phase contained a surfactant which was polyvinyl alcohol in the amount of 0.5 weight percent. The naphtha solution passed through the aqueous phase 3 for a period of about 5 seconds where naphtha droplets were coated with polyvinyl alcohol and water membranes. The droplets then entered the solvent phase 4 composed of two liters of solvent 100 neutral. In this phase aromatics inside the droplets selectively diffused into the solvent phase through the polyvinyl alcohol-water membranes. The droplets then coalesced in zone 6 and was withdrawn through line 7 as product. The product was found to contain aromatics, naphthenes and paraffins at concentrations of 15.16, 15.36 and 69.48 weight percent respectively. This compared favorably with the original concentrations, indicating an enrichment of paraffins in the product. Aromatics permeated most readily and paraffins least readily through the membrane. The surfactant and water molecules carried by the naphtha droplets to phase 5 agglomerated into droplets, falling back to aqueous phase 3 so that no make-up of surfactants was needed.

Other modifications of this invention are readily apparent. The solvent phase containing the more permeable member or members of the solution may be removed and the solvent separated from the permeate by distillation or other well-known processes.

Although this invention has been described with some degree of particularity, it is intended only to be restricted by the attached claims.

What is claimed is:

1. In improved process for separating two hydrocarbon elements which are in admixture which comprises passing said mixture into an aqueous phase at a rate which allows the hydrocarbon mixture to disperse into said aqueous phase, said aqueous phase containing 0.001 to 0.5% by weight of an ionic surfactant, forming a surfactant membrane around droplets of said dispersed mixture said surfactant membrane allowing one hydrocarbon of said mixture to permeate more readily than the other hydrocarbon of said mixture, passing said surfactant membrane coated droplets into a solvent phase whereby at least a portion of said more permeable hydrocarbon passes into said solvent phase and at least a portion of said less permeable hydrocarbon remains within said surfactant membrane, forming a coalesced drop phase of surfactant membrane droplets wherein said surfactant membranes are ruptured and material rich in said less permeable hydrocarbon is released, maintaining said coalesced drop phase whereby said material rich in said less permeable hydrocarbon is substantially prevented from passing back into said solvent phase.

2. The process of claim 1 wherein said material rich in said less permeable hydrocarbon is removed and recovered as product.

3. The process of claim 1 wherein solvent and the portion of said more permeable hydrocarbon which passes into said solvent phase are recovered and said more permeable hydrocarbon separated from said solvent.

4. The process of claim 3 wherein said solvent is organic and said more permeable hydrocarbon is a normal paraffin.

5. A process for separating two hydrocarbons which are in admixture which comprises passing said mixture into an aqueous phase, said mixture being passed at a sufficiently slow rate so that it disperses within said aqueous phase, said aqueous phase containing a minor amount of a surfactant, forming a liquid surfactant membrane around the droplets of said mixtures, said membrane allowing one hydrocarbon to permeate more readily than the other hydrocarbon with which it is in admixture, maintaining an organic solvent phase distinct from said aqueous phase, said solvent phase being miscible with the hydrocarbons of said mixture, passing said surfactant membrane covered droplets into said solvent phase whereby at least a portion of said more permeable hydrocarbon passes into said solvent phase and at least a portion of said less permeable hydrocarbon remains within said surfactant membrane, forming a coalesced drop phase of surfactant membrane droplets wherein said membranes are ruptured releasing said portion of said less permeable hydrocarbon, maintaining said coalesced drop phase thereby substantially preventing less permeable hydrocarbon from passing into said solvent phase containing said more permeable hydrocarbon, recovering said less permeable hydrocarbon.

6. The process of claim 5 wherein said surfactant is anionic.

References Cited
UNITED STATES PATENTS
1,520,953  12/1924  Johansen _____ 208—308
3,168,585  2/1965  McCarthy _____ 210—21

HERBERT LEVINE, *Primary Examiner.*